United States Patent
Harms et al.

[11] 3,873,039
[45] Mar. 25, 1975

[54] WINCH

[75] Inventors: Horst Harms; Hans-Jürgen Kunsch, both of Bremerhaven, Germany

[73] Assignee: Aktien-Gesellschaft "Weser", Bremen, Germany

[22] Filed: Feb. 14, 1974

[21] Appl. No.: 442,574

[30] Foreign Application Priority Data
Feb. 17, 1973 Germany............................ 2307889

[52] U.S. Cl............................................. 242/54 R
[51] Int. Cl........................................... B65h 75/00
[58] Field of Search........... 242/54 R; 254/144, 145, 254/175.7, 183

[56] References Cited
UNITED STATES PATENTS
| | | | |
|---|---|---|---|
| 3,306,584 | 2/1967 | Menetrier | 242/54 R X |
| 3,467,360 | 9/1969 | Mizell | 242/54 R X |
| 3,643,886 | 2/1972 | Colton | 242/54 R X |

Primary Examiner—Edward J. McCarthy
Attorney, Agent, or Firm—Michael S. Striker

[57] ABSTRACT

A winch which is particularly suitable for deep-sea application has a first rotational storage drum storing a supply of one type of rope, cable or the like, and one or more second rotatable storage drums which also store a supply of such an element, but an element which is different from the first-mentioned one. A pair of driven rotational friction drums are provided which receive a length of one or the other of these elements so that the length is trained about the peripheries of the friction drums to pay out the respective element or take it up when the friction drums rotate. The friction drums each have a center portion such as a hub, and an annular portion which surrounds the hub and is releasably connected to the same. The outer circumferential surface of the annular portion is formed with circumferentially extending grooves in which the respective length of the element being taken up or paid out is accommodated. The annular portion can be exchanged for another one having differently configurated circumferentially extending grooves.

8 Claims, 5 Drawing Figures 3,873,039

WINCH

BACKGROUND OF THE INVENTION

The present invention relates generally to a winch, and more particularly to a winch which is especially suitable for deep-sea applications.

The construction and operation of winches is already well known and is not believed to require a detailed discussion herein. A particularly important category of such winches is used on board ship, and especially for deep-sea applications. It is known, for instance, to use winches on board of oceanographic vessels for scientific investigation of the ocean, including the ocean bottom. Sometimes winches of this type are also used on fishing vessels or other special marine vessels. Winches of this type are used for deploying and recovering of various scientific gear that must be immersed in the water, sometimes at the bottom of the ocean, they are used as cable winches for laying or recovering deep-sea cables such as telephone cables and the like, as cable winches which pay out or recover cables carrying measuring instruments from which data are sent back on board the vessel via the cable, and for other applications which will suggest themselves to those skilled in the art.

As has already been mentioned, winches of this general type are already known. The construction of the known winches is accommodated to a particular rope, cable or the like, which hereafter will be generically designated as elongated flexible elements. However, in many instances it is absolutely necessary to deploy and recover elongated flexible elements having a various different diameters, cross sections or internal and external structures, which means that heretofore it was frequently necessary to install for each different elongated flexible element a separate winch arrangement. It is evident that this is not only expensive in terms of the investment required, but also space consuming. The latter consideration is perhaps even more important than the consideration of expense, because space is very frequently at a premium on marine vessels. Added to this is still a third factor, namely the fact that the more winches are installed on deck of a vessel, the more possibilities exist for accidents to personnel on board ship.

SUMMARY OF THE INVENTION

Accordingly, it is a general object of the present invention to overcome the disadvantages of the prior art.

More particularly, it is an object of the present invention to provide an improved winch, which is particularly suitable for deep-sea applications, which avoids the aforementioned disadvantages.

Still more particularly, it is an object of the invention to provide such a winch wherein a single friction drum arrangement of the winch is suitable for paying out and taking-up elongated flexible elements of the most diverse types.

An additional object of the invention is to provide such a winch which is relatively simple in its construction and reliable in its operation.

In keeping with the above objects, and others which will become apparent hereafter, one feature of the invention resides in a winch, particularly in a deep-sea winch, which comprises a first rotatable storage drum storing a supply of a first elongated flexible element, and at least one second rotatable storage drum storing a supply of different second elongated second elements. The flexible elements may differ in kind, that is one may be a rope and the other a cable or the like, and/or they may differ in cross section, diameter or the like.

The winch further comprises a pair of driven rotatable friction drums adapted to receive the elements selectively and to have lengths of the elements trained about the peripheries of the friction drums for paying out and taking-up of the respective element. The friction drums each comprises a center portion and an annular portion which surrounds and is releasably connected to the center portion and which has an outer circumferential surface provided with circumferentially extending grooves.

The annular portion can be replaced with one or more other ones grooves of which are differently configurated.

It is thus merely necessary to replace one of the annular portion with another, to thereby be able to use a different one of the elongated flexible elements. The friction required between the element and the friction drums is of course obtained by the circumferentially extending grooves; this is well known, as is the fact that in order to provide maximum possible protection for the outer circumferential surface of the respective elongated flexible element the contour of the grooves and the dimension of the grooved cross section must be rather precisely accommodated to the contour and cross section of the respective elongated flexible element, which is why it is not possible to use one groove for differently contoured and cross sectioned flexible elements.

Instead of having to use a plurality of individual winches, the present invention makes it possible to provide precise adaptation of the grooves to the respective elongated flexible element which is to be paid out or taken up, simply by exchanging the annular portions.

It is now necessary only to provide a single winch which can cooperate with any and all elongated flexible element that need to be paid out or taken up, simply by having available different annular portions formed with differently contoured grooves each type of groove being accommodated to the configuration of one of the elongated flexible elements. Moreover, it is necessary to provide only a single drive now, since only a single winch is present. The exchange of one annular portion for another is very simple, and can be greatly facilitated if the annular portions are composed of two or more arcuately curved segments that can be secured to and removed from a center portion, such as a hub or the like. Moreover, only the friction drums need be provided with a drive which is capable of withstanding the maximum stresses that can be transmitted to these drums by the cable or other elongated flexible elements when it is paid out, so that only relatively weak drives can be provided for the storage drums on which the elongated flexible elements are stored until they must be supplied from the storage drums to the friction drums. This further decreases the expense of the installation and, since the number of components that must be installed on deck of the vessel is also drastically reduced, it decreases the danger of accident.

The novel features which are considered as characteristic for the invention are set forth in particular in the appended claims. The invention itself, however, both as to its construction and its method of operation,

DESCRIPTION OF THE PREFERRED EMBODIMENTS

Figure 1:
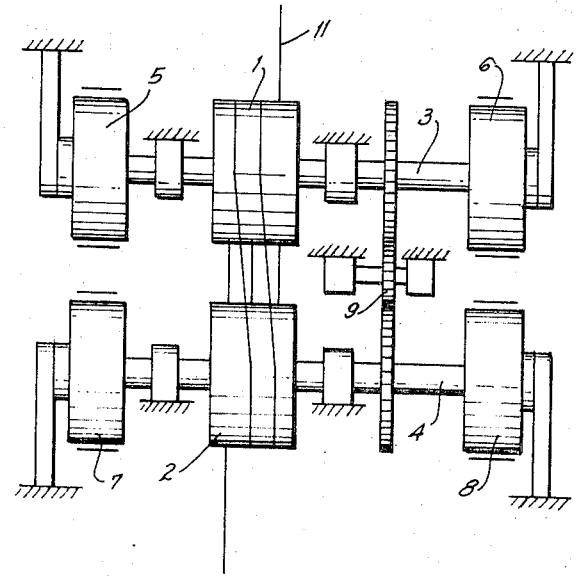
FIG. 1 is a diagrammatic top-plan view of the winch according to the present invention.

Discussing now the drawing in detail, and referring firstly to FIG. 1, it will be seen that reference numeral 1 identifies a friction winch. It is not believed to be necessary to discuss the general construction and operation of shipboard winches in great detail, but reference may be had for a more specific discussion to U.S. naval training course NAVPERS 10524–C pages 326–329.

Figure 4:
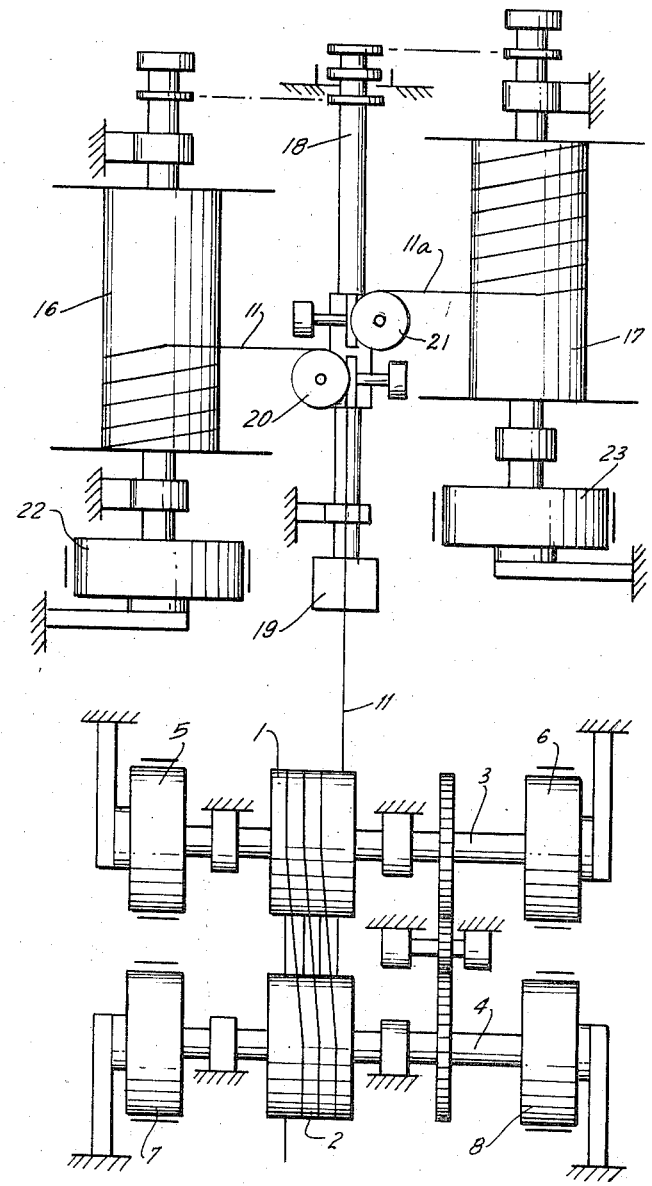
FIG. 4 is a top-plan view of an installation utilizing the winch of FIG. 1 and provided with storage drums for different elongated flexible elements.

The winch according to the present invention, which is also shown in the organization of FIG. 4, has a pair of friction drums 1 and 2 which are mounted on parallel shafts 3 and 4 for rotation. In the illustrated embodiment, the shaft 3 is provided with two hydraulic motors 5 and 6, whereas the shaft 4 is provided with two hydraulic motors 7 and 8. These motors serve to drive the shafts 3 and 4 in rotation for paying out or taking-up an elongated flexible element 11 or 11a (compare FIG. 4). A differential gear drive 9 is provided which serves to assure a synchronous rotation of the shafts 3 and 4 in known manner. Each of the motors 5–8 is provided in known manner with a band brake and with a torque support, as shown.

As is customary in the friction drums of friction winches, the drums 1 and 2 are provided in their outer circumferential surfaces with circumferentially extending grooves 10 in which the respective elongated flexible element 11 or 11a is guided during paying out or taking up.

Thus far, the construction described is not novel, being well known in the art.

Figure 2:
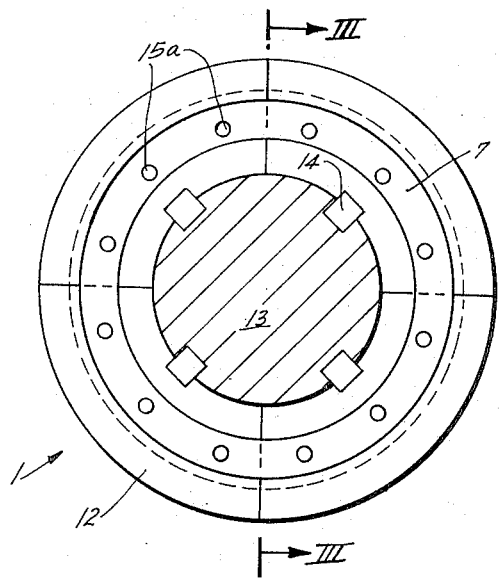
FIG. 2 illustrates in an end view one of the friction drums of the winch of FIG. 1, shown mounted on a sectioned shaft.
Figure 3:
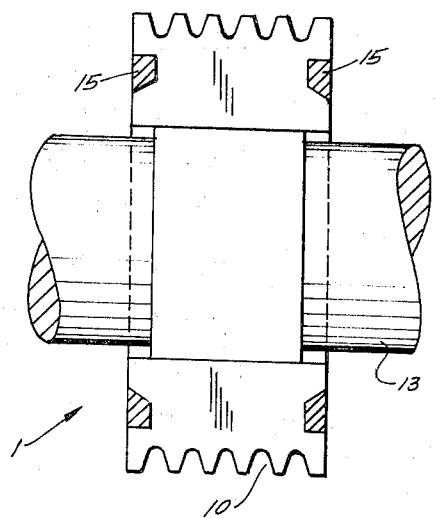
FIG. 3 is a section taken on line III—III of FIG. 2.

According to the present invention, however, each of the friction drums 1 and 2 can be accommodated in a very simple manner to different types or different configurations or cross sections of the elongated flexible elements 11, 11a, which elements may obviously be ropes, cables or the like. To make this possible, each of the drums 1 and 2, of which only the drum 1 is shown in detail in FIGS. 2 and 3, is provided with an outer annular portion composed of a plurality of arcuately curved segments 12. There may be two of these, there may be three or four, but in any case they add up to a circumferentially complete annular portion which is mounted on a central portion, for instance a hub 13, directly on the drive shaft or the like. The segments 12 are prevented from rotation relative to the hub or drive shaft 13 by means of axially extending slots formed in the outer circumferential surface of the hub 13 and in the inner circumferential surface of the respective segment 12, and which accommodate keys 14 as shown in FIG. 2. In addition, ring members 15 are provided which may be located at one or at both axial ends of the respective drum. FIG. 3 shows most clearly that these ring members 15 may be recessed in circumferential grooves formed in the axial end face or end faces of the respective drum, and FIG. 2 shows that the respective rings 15 may be secured with the segments 12 by means of screws 15a, bolts, pins or the like. With such a construction, the segments 12 constituting the respective outer annular portion are fixedly connected with the hub or shaft 13.

Figure 5:
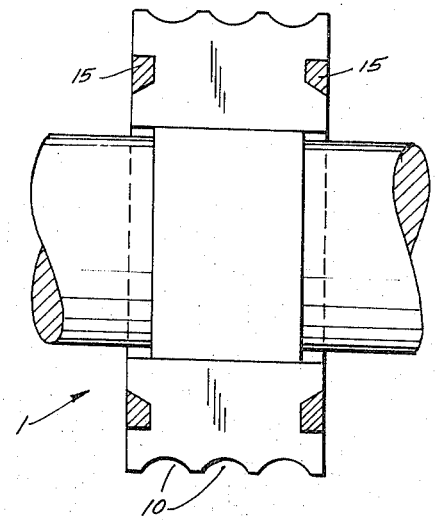
FIG. 5 is a view similar to FIG. 3 but illustrating the friction drum as being provided with a different annular portion.

When it is desired to handle —i.e. pay out or take-up— an elongated flexible element which differs in kind, in cross section or in contour from the one that has been previously handled, for instance if it is desired to utilize the element 11a which may be a thicker cable than the element 11 which may have been a thinner cable, then the outer annular element heretofore used is demounted which evidently can be carried out rapidly, and is replaced with another one which is again composed of segments 12 as shown in FIG. 5. FIG. 5, however, shows that this other outer annular element has grooves 10 which are differently contoured from the ones shown in FIG. 3, and in particular which are accommodated to the specific flexible element that is to be paid out or taken-up. It should be understood that the particular dimensioning and cross sectioning of the grooves shown in FIGS. 3 and 5 is exemplary only and it is not to be considered restrictive at all.

Advantageously, and as shown in FIG. 4, the winch according to the present invention will be provided in conjunction with a plurality of rotatable storage drums of which two have been shown in FIG. 4 and are identified with reference numerals 16 and 17, respectively. Each of the storage drums accommodates a supply of a different elongated flexible element, such as the elements 11 and 11a. There can of course be as many of these storage drums provided as it is anticipated that different elongated flexible elements will be required. It is advantageous if the storage drums 16 and 17 are mounted in such a way as to rotate about parallel axes which should further extend in parallelism with the direction in which the respective elongated element (the element 11 in FIG. 4) is being supplied to the friction drums 1 and 2. This makes it possible to supply the two storage drums 16 and 17 with a single guiding arrangement for guiding the respective elongated element 11 or 11a to the friction drums 1 and 2. In FIG. 4 this guiding arrangement utilizes a spindle 18 provided with a drive motor 19 which can be disengaged from the spindle so that the latter does not rotate at such times as it is desired to switch over from one of the drums 16, 17 to the other. In other words, the spindle 18 should not rotate when the use of the element 11 for instance is to be terminated, and the element 11a is now to be paid out, or vice versa. The spindle 18 is provided with a carriage on which two rollers 20 and 21 are mounted, one for each of the elements 11 11a. These rollers 20, 21 can be adjusted in the direction in which the element 11, 11a travels, and to facilitate such adjustment the two rollers are balanced. The end of the spindle 18 which is remote from the drive motor 19 may be journalled in a pressure bearing of known construction which is provided with a measuring arrangement that can measure the tensile forces transmitted to it via the spindle from the element 11 or 11a intermediate the friction drums 1, 2 and the spindle 18. Such an arrangement can be connected with an electrical feedback system that can serve to regulate the drive of the storage drums 16, 17 for pay out or take-up purposes in automatic dependence upon the rotation of the friction drums 1, 2. However, this does not form a part of the invention and therefore requires no detailed discussion. The drums 16 and 17 themselves are also provided with hydraulic drives 22, 23, respectively, although other types of drives could be utilized. If hydraulic drives are provided,, they are provided in conventional manner with band brakes. As mentioned earlier, such drives, band brakes and associated components are well known, inter alia from the aforementioned naval training course. It will be appreciated that several pair of storage drums such as the ones designated with reference numerals 16 and 17 in FIG. 4 could arranged one behind the other, and each of the storage drums could be used to store a different elongated flexible element, so that these various elements could then be supplied to the friction drums 1, 2 individually and if and when required, the only adjustment that is necessitated during change-over from one element to another being the replacement of the outer annular portion on the respective friction drums 1 and 2 by another appropriate one.

It will be understood that each of the elements described above, or two or more together, may also find a useful application in other types of constructions differing from the types described above.

While the invention has been illustrated and described as embodied in a winch, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a winch, particularly in a deep-sea winch, a combination comprising a first rotatable storage drum storing a supply of a first elongated flexible element; at least one second rotatable storage drum storing a supply of a different second elongated flexible element; and a pair of driven rotatable friction drums adapted to receive said elements selectively and to have lengths of said elements trained about the peripheries of said friction drums for paying out and taking-up of the respective element, said friction drums each comprising a center portion and an annular portion surrounding and releasably connected to said center portion and having an outer circumferential surface provided with circumferentially extending grooves.

2. A combination as defined in claim 1, wherein said annular portion is composed of at least two curved segments; and further comprising securing means for releasably securing said segments to said center portion for rotation with but not relative to the same.

3. A combination as defined in claim 1, wherein said grooves are configured for accommodating a length of one of said elements therein; and further comprising at least one additional annular portion similar to the first-mentioned one but provided with circumferentially extending grooves which are different from the first-mentioned grooves and are dimensioned to accommodate a length of the other of said elements.

4. A combination as defined in claim 3, wherein each of said annular portions is composed of at least two curved segments; and further comprising securing means for releasably securing the segments of one of said annular portions to said center portion, depending upon which of said elements is to be trained about said friction drums.

5. A combination as defined in claim 4, wherein said center portion and said curved segments are provided with respective slots in their respective juxtaposed surfaces, said slots extending parallel to the axis of rotation of the respective friction drum; and wherein said securing means comprises keys recieved in the respective slots.

6. A combination as defined in claim 5, wherein said annular portions each have two opposite axial end faces, and wherein each of said end faces is provided with an annular recess surrounding said center portion; said securing means further comprising a ring received in each of said annular recesses, and connecting elements connecting the respective ring to the associated annular portion.

7. A combination as defined in claim 1, wherein said storage drums are mounted for rotation about spaced parallel axes; and further comprising a guide for guiding one or the other of said elements from the respective storage drum to said friction drums in a direction substantially parallel to said axes.

8. A combination as defined in claim 7, wherein said friction drums are mounted for rotation about axes of rotation which extend substantially normal to said parallel axes.

* * * * *